US006700804B1

(12) United States Patent
Reichard (10) Patent No.: US 6,700,804 B1
(45) Date of Patent: Mar. 2, 2004

(54) INTEGRATED MULTI-LEVEL INVERTER ASSEMBLY

(75) Inventor: Jeffrey A. Reichard, Oconomowoc, WI (US)

(73) Assignee: American Superconductor Corporation, Westborough, MA (US)

( * ) Notice: Subject to any disclaimer, the term of this patent is extended or adjusted under 35 U.S.C. 154(b) by 2 days.

(21) Appl. No.: 09/704,899

(22) Filed: Nov. 2, 2000

(51) Int. Cl.$^7$ .................................................. H02H 7/00
(52) U.S. Cl. ........................ 363/51; 363/132; 323/351
(58) Field of Search .............................. 363/15, 51, 52, 363/55, 98, 131, 132, 163; 323/318, 350, 351; 700/297, 286; 361/728, 729

(56) References Cited

U.S. PATENT DOCUMENTS 5,726,873 A * 3/1998 Gold et al. .................... 363/98
5,909,367 A * 6/1999 Change ....................... 363/163

OTHER PUBLICATIONS

Patent Abstracts of Japan, vol. 2000, No. 12 of JP 2000 270562 A.
Patent Abstracts of Japan, vol. 1999, No. 12 of JP 11 196564 A.
Rojas et al., "PWM Control Method for a Four–Level Inverter", IEE Proceedings: Electric Power Applications, Institution of Electrical Engineers, GB, vol. 142, No. 6, Nov., 1995.
Jeff Reichard et al., "Improved IGBT Structure Allows P.C. Board Mounted Modules," PCIM, pp. 8–14 (Aug. 1997).
M. Feldvoβ et al., "A new compact inverter concept with low profile solderable Econopack modules," Powersystems World '96 Conference, PCIM, pp. 12 (Sep. 7–13, 1996).
http://www.iellc.com/company_history.htm (Apr. 27, 2000). Sheet containing highlighted materials from original attached.
http://www.iellc.com/pcb_based_inverter.htm, pp. 1–2 (Apr. 27, 2000). Sheet containing highlighted materials from original attached.
http://www.iellc.com/hybrid_inverter_technology.htm, pp. 1–2 (Apr. 27, 2000). Sheet containing highlighted materials from original attached.
http://www.iellc.com/applications.htm (Apr. 27, 2000). Sheet containing highlighted materials from original attached.
http://www.iellc.com/unit_specs.htm, pp. 1–4 (Apr. 27, 2000).

* cited by examiner

Primary Examiner—Jessica Han
(74) Attorney, Agent, or Firm—Fish & Richardson P.C.

(57) ABSTRACT

An integrated assembly includes a power converter module having an input bus bar, an output bus bar, an n-level converter and driver circuitry adapted to control the n-level converter, in response to received control signals. The n-level converter switches between a pair of voltage levels selected from a set of n levels, where n≧3. The integrated assembly also includes a controller providing the control signals to the driver circuitry, and fiber optic lines connecting the driver circuitry of the n-level converter to the controller. The integrated assembly includes DC-DC switching power supply, having an input for receiving a DC input voltage, for generating a DC output voltage and providing it to a load. The switching power supply includes controlled switching devices, each having an input terminal and an output terminal. Each of the controlled switching devices receives a portion of the DC input voltage and each has a voltage-rating characteristic that is less than the DC input voltage. The sum of these voltage-rating characteristics for each of the controlled switching devices is greater than the DC input voltage.

19 Claims, 8 Drawing Sheets

INTEGRATED MULTI-LEVEL INVERTER ASSEMBLY

TECHNICAL FIELD

The invention relates to power conversion electronics.

BACKGROUND OF THE INVENTION

Alternating current (AC) has been almost universally adopted for utility power distribution and consequently is the standard form of electrical power for industrial, commercial, and domestic purposes. Independent of the source of energy used to generate the electricity (for example, hydroelectric, nuclear, solar, wind-power), AC must be provided at a fixed frequency of 60 Hz in North America (usually 50 Hz elsewhere) and phase-synchronized before being made available to the large power grid from which users obtain electricity.

Semiconductor-based power electronic converters are often used to conform electrical power generated from various power sources to the 60 Hz fixed frequency, phase-synchronized AC required by the grid.

Power compensation systems are often used to provide real and/or reactive power to a utility power system in response to voltage instabilities or fault conditions on the systems. In such power compensation systems, DC sources including batteries, capacitor banks, fuel cells, or superconducting magnetic energy storage (SMES) devices supply power to an inverter which converts the DC to AC before introduction to the utility grid. Unfortunately, the DC-AC rectification/inversion process wastes a portion of the generated power due primarily to the dissipation occurring within the large energy storage devices (e.g., inductors) and within the semiconductor devices themselves.

DC to AC power converters typically incorporate switching circuitry which receives a DC voltage and is controlled to generate a pulse width modulated (PWM) signal. This power signal is then provided to a filter network to provide an AC power signal. Typically, the DC signal is pulsed and applied to the primary windings of a transformer. This, in turn, generates a pulsed signal on the secondary windings of the transformer, where the amplitude of the secondary signal is varied in accordance with the ratio of primary to secondary transformer windings. A rectifier and capacitor are typically employed to smooth the pulsed secondary voltage into a AC voltage.

DC to DC converters are often used to convert a DC signal of a first amplitude into a DC signal of a second amplitude. One type of DC to DC converter is known as a "buck" converter and uses a switching device to pulse the DC power signal across a frequency dependant filter network, such as an inductive-capacitive (or LC) filter. The amplitude of the signal is directly proportional to the duty cycle of the pulsating signal driving the switching device. Typically, these switching devices are power transistors, relays, or any other form of electronic switching device.

SUMMARY OF THE INVENTION

The invention relates to power conversion circuitry operated to perform DC-AC, DC-DC, AC-DC, and AC-AC power conversion.

In one aspect of the invention, an integrated assembly includes a power converter module having an input bus bar, an output bus bar, an n-level inverter and driver circuitry adapted to control the n-level converter, in response to received control signals. The n-level converter switches between a pair of voltage levels selected from a set of n levels, where n is 3 or greater. The integrated assembly also includes a controller providing the control signals to the driver circuitry, and fiber optic lines connecting the driver circuitry of the n-level converter to the controller.

Embodiments of this aspect of the invention may include one or more of the following features. The n-level converter is capable of generating power levels in excess of 1 megawatt and preferably as high as 2.5 megawatts at 7.6 KV. The integrated assembly has a width of approximately 20 inches, a length of approximately 28 inches, and a height of approximately 23 inches. The n-level converter includes a printed circuit board (PCB). The n-level converter is an n-level inverter.

The integrated assembly includes a DC-DC converter which, in operation, receives a DC input voltage, generates a DC output voltage and provides the DC output voltage to the n-level inverter. The DC-DC converter includes controlled switching devices (e.g., power transistors), each receiving a portion of the DC input voltage and each having a voltage rating characteristic less than said DC input voltage. The sum of the voltage rating characteristics of each of the controlled switching devices is greater than the DC input voltage. The controlled switching devices include a first switching device and a second switching device, and the DC-DC converter includes a filter circuit connected between output terminals of the first and second switching devices. The filter circuit includes a capacitive device for providing the DC output voltage to a load, such as auxiliary electronic circuitry associated with the n-level converter. The integrated assembly includes a diode, positioned between the outputs of the first and second switching devices, for providing a discharge path for the capacitive device of the filter circuit.

The controller is adapted to selectively energize and deenergize said switching devices, a duty cycle of the switching devices controlling the amplitude of the DC output voltage. The controller, in operation, is configured to monitor the DC output voltage and adjust said duty cycle of the switching devices to maintain said DC output voltage at a predetermined level.

The controller includes protection circuitry, which in response to an indication of a fault condition of the integrated assembly provides a signal to the controller to terminate operation of the n-level power converter module. The fault condition may be an overvoltage, undervoltage, overcurrent, or an over-temperature condition. The protection circuitry includes a sensor, which monitors the output of the n-level power converter module and, in response to an overvoltage condition at an output of the n-level power converter module, provides the signal to the controller to terminate operation of the n-level power converter module. The sensor monitors the output current of the n-level power converter module. The integrated assembly also includes a cooling system including, for example, a heat sink.

Among other advantages, the n-level power converter module is used in a stand-alone configuration, integrated, for example, with a high power DC power source. In addition, the microcontroller for providing the intelligence required by the n-level converter module is part of (i.e., on-board) the integrated assembly. Because the "on-board" microcontroller can be programmed, the n-level converter module's functionality can be changed for use in different applications. Furthermore, the n-level inverter module is bi-directional. By "bi-directional" it is meant that electric power is allowed to flow in either direction through the n-level inverter. The power flowing out of the inverter can have different characteristics than the power flowing in; providing a method for conditioning the power. Thus, the microcontroller of the n-level inverter module can be programmed to perform AC-DC conversion (rectification), DC-DC conversion, DC-AC conversion (inversion), and AC-AC conversion. For example, in one application, the integrated assembly is used to condition power for a motor drive, while in another application, it is used as part of an uninterruptible power supply (UPS). The ability to use the same integrated assembly for different applications provides tremendous flexibility to the user. Although the various parts of the system (e.g., protection circuitry, switch sequencing) can operate relatively autonomously, the particular manner in which they operate can be changed to, suit a particular application.

Fiber optic lines provide high speed, noise immune communication of signals between components of the system; thus, transmission losses are reduced. Furthermore, because the n-level converter is constructed on a printed circuit board, the interconnection paths between components (e.g., high power switching devices) of the converter and drive circuitry are reduced. In essence, the interconnection paths designed within the PCB replace many of the relatively long interconnection paths typically used to interconnect components.

The components of the n-level inverter module are assembled together in a hybrid assembly including bus bars and PCBs, thereby reducing size and cost. The hybrid assembly also eliminates much of the wiring typically associated with conventional high power assemblies. In particular, automated wave-soldering, short interconnects, and direct connections are used to interconnect the components in the hybrid assembly. With this arrangement, the only external buswork required is that between the integrated assembly and the outside world to which it supplies power. Thus, a "connect-and-go" integrated assembly of reduced modular size that is easy to fabricate is provided. And aside from all of the advantages of modularizing the assembly, by providing the interconnects using a non-inductive approach, the electrical performance of the assembly is significantly improved.

In general, minimizing parasitic losses in the assembly reduces the overall losses of the unit. Thus, the integrated approach allows the use of smaller, generally more available and less expensive components and reduces cooling requirements.

Among the interconnection paths being replaced are the relatively bulky copper buses having large screw terminals and separate snubber capacitors having leads connected to the buses. These fabricated busworks and bulky interconnects contribute substantially to the stray inductance and capacitance in the assembly. These parasitic losses tremendously limit the available power throughput of the circuitry as well as the speed at which the switching devices in high power inverters can be switched. The hybrid construction provides relatively short interconnection paths between the high-powered switching components thus minimizing inductance and other parasitic losses. Minimizing these parasitic losses eliminates the need for additional circuitry, such as capacitive snubbers, typically used to compensate for capacitance. Furthermore, the level of filtering at the output of the assembly is reduced, thereby reducing the size and power loss associated with such circuitry.

In another aspect of the invention, a switching power supply includes controlled switching devices, each receiving a portion of a DC input voltage and each having a voltage rating characteristic that is less than the DC input voltage, the sum of the voltage rating characteristics being greater than the DC input voltage.

Embodiments of this aspect of the invention may include one or more of the following features. The controlled switching devices include a first switching device and a second switching device and a filter circuit connected between output terminals of the first and second switching devices. The filter circuit includes a capacitive device for providing the DC output voltage to a load (e.g., auxiliary circuitry associated with the n-level inverter discussed above). The first and second switching devices are power transistors. The switching power supply includes at least one diode, positioned between the outputs of the first and second switching devices, for providing a discharge path for the capacitive device of the filter circuit. The switching power supply includes a controller for selectively energizing and deenergizing the switching devices, where a duty cycle of the switching devices controls the amplitude of the DC output voltage. The controller, in operation, is configured to monitor the DC output voltage and adjust the duty cycle of the switching devices to maintain the DC output voltage at a predetermined level.

In another aspect of this invention, a switching power supply includes a first and a second converter circuit, each having a first and a second switching device, each of the first and second switching devices receiving a portion of the DC input voltage and having a voltage rating characteristic less than the DC input voltage. The sum of the voltage rating characteristics for the first switching devices is greater than the DC input voltage of the first and second converters.

Embodiments of this aspect of the invention may include one or more of the following features. The first and second converter circuits based on are buck converter designs. Each of the converter circuits includes a filter circuit, having a capacitor for providing a portion of the DC output voltage to the load. The first switching devices are power transistors, while the second switching devices are diodes for providing a discharge path for each capacitor of each filter.

The switching power supply includes a controller for selectively energizing and deenergizing the first switching devices, with a duty cycle of the first switching devices controlling the amplitude of the DC output voltage. The controller, in operation, is configured to monitor the DC output voltage and adjust the duty cycle of the first switching devices to maintain the DC output voltage at a predetermined level.

The advantages of the above aspects of the invention are numerous. In general, the DC-DC converter switching power supply can convert relatively high DC voltage levels to intermediate or low voltage levels. This advantage is particularly important for applications in which DC voltages lower than that being provided by DC power supplies (e.g., capacitor energy storage banks, batteries, or SMES devices) are required. For example, a relatively higher DC voltage provided to the input of an inverter can be converted to a lower DC voltage for auxiliary electronics associated with the inverter. The mirrored arrangement of the DC-DC converter switching power supply is also self-balancing. That is, if one of the converters tries to draw more power, its voltage will automatically be reduced. This self-balancing feature is performed without separate external control.

In general, the switching power supply employs two or more switching devices which distribute the DC input voltage across these devices, eliminating the requirement that the switching devices have a voltage rating equal to or greater than the DC input voltage. As stated above, this invention allows the designer to utilize multiple, inexpensive, low voltage switching devices, as opposed to a single, expensive, high-voltage switching device.

The DC-DC switching power supply described above is well suited for use in providing an output DC voltage to an inverter. In one embodiment, the load to the DC-DC switching power supply is a tri-level inverter. The switching power supply can be fabricated on a printed circuit board and included as part of an integrated assembly including a tri-level inverter, microcontroller, and other electronics.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1A:
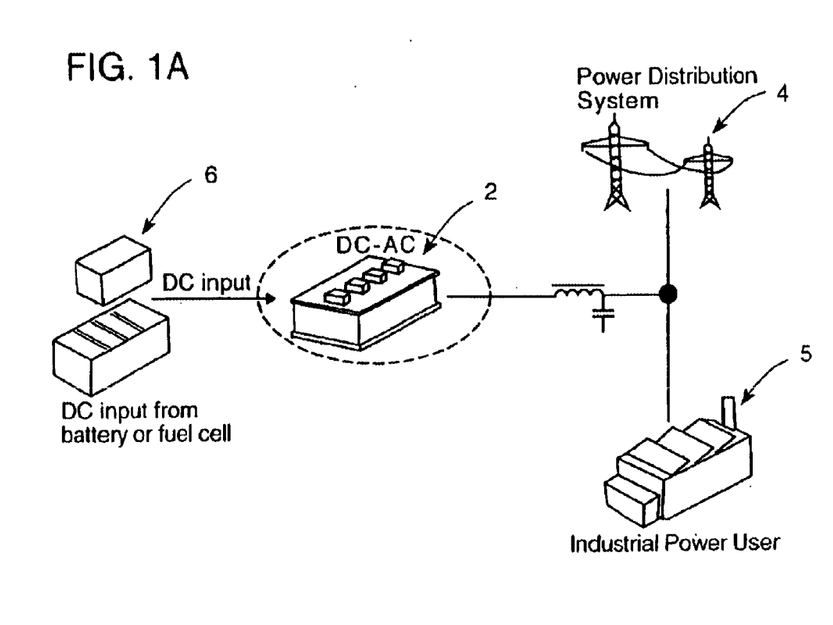
FIG. 1A is a diagrammatic representation of a power conversion module for converting a DC input to an AC output for use with a power distribution system.

Referring to FIG. 1A, a power conversion module 2 is shown connected to a power distribution system 4 of a public utility distribution system for serving among others, industrial power users 5. In operation, power conversion module 2 receives power from a DC power source 6 (e.g., capacitor bank, fuel cell, superconducting magnetic energy storage) and provides AC power to the utility distribution system through a filter network 8.

Figure 1B:
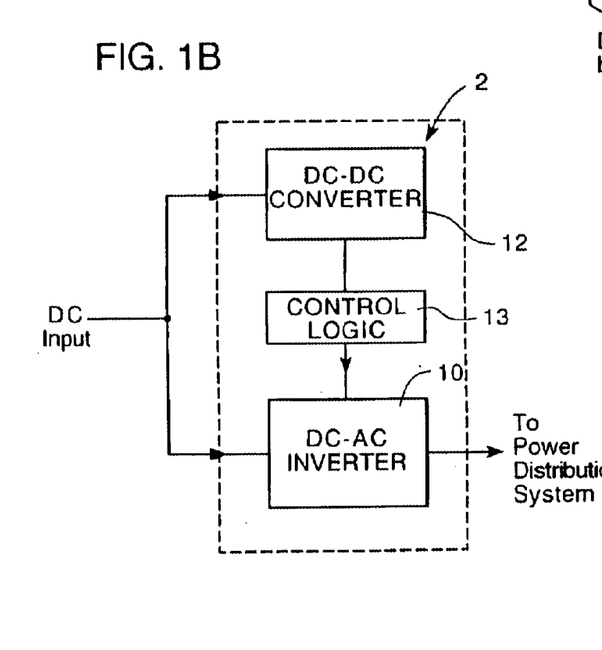
FIG. 1B is a block diagram of the power conversion module of FIG. 1 including a DC-DC converter in accordance with the invention.

Referring to FIG. 1B, power conversion module 2 includes an n-level DC to AC inverter 10 (n≧3) for converting a relatively high DC input voltage (e.g. 1,800 volts DC) from DC power source 6 to an AC voltage suitable for being provided to power distribution system 4. Power conversion module 2 also includes a DC-DC converter 12 which also receives the relatively high DC input voltage. DC-DC converter 12 converts the DC input voltage to a lower voltage (e.g., 48 VDC) suitable for driving auxiliary electronic circuitry associated with the inverter, as wells as control logic signals needed to drive the inverter.

Figure 2:
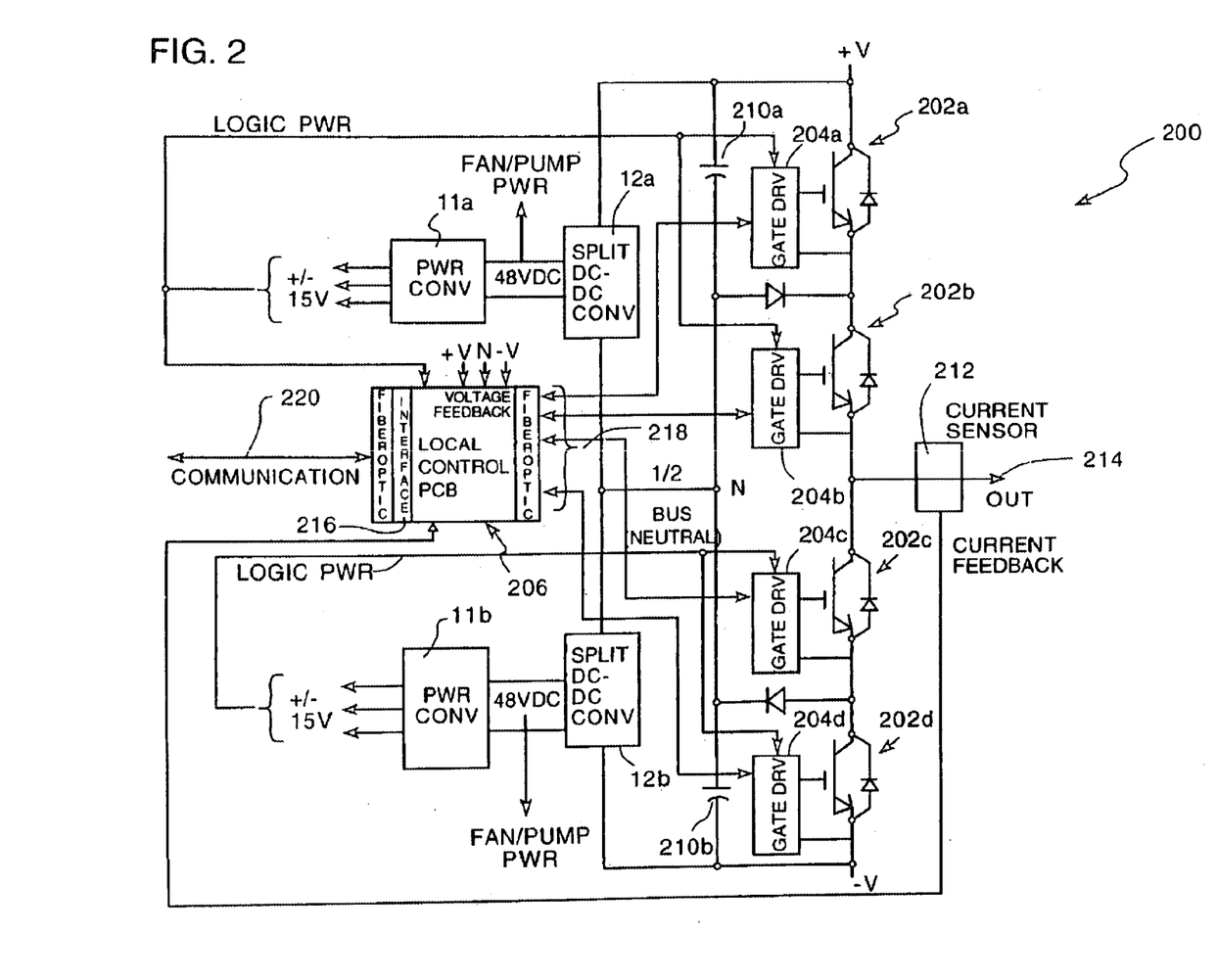
FIG. 2 is a schematic diagram of a tri-level inverter module.

Referring to FIG. 2, in this embodiment DC-AC inverter 10 is a tri-level inverter module 200. Tri-level inverter module 200 has the capacity for handling power levels in excess of 2.5 megawatts per power pole with voltages as high as 7.6 KV DC allowing direct connection to a 4160 VAC line. As will be described below, this electrical performance is achieved within a module having outer dimensions of approximately 20 inches wide, 28 inches deep, and 23 inches high. Tri-level inverter may be a quasi-resonant inverter as described in U.S. Ser. No. 09/705,158, entitled "Tri-Level Quasi Resonant Power Inverter," filed Nov. 2, 2000, and incorporated herein by reference.

In this embodiment, tri-level inverter module 200 includes capacitor banks 210a, 210b, each of which serves as a DC energy source, and provides voltages between 1500V–2000V (e.g., 1800V). Tri-level inverter module 200 also includes switching transistors 202a–202d, corresponding gate drivers 204a–204d, a microcontroller, 206, and DC to DC converters 10a, 10b. In operation, switching transistors 202a–202d are independently controlled to generate pulse-width modulated (PWM) signals from a DC input supplied from capacitor banks 210a, 210b. Switching transistors 202a–202d are capable of switching signals at current levels in the hundreds of amperes. The PWM signals when passed through a filter (not shown) at the output of tri-level inverter module 200 provides an AC output signal. In particular, microcontroller 206 provides control signals to gate drivers 204a–204d which, in turn generate drive signals for controlling the gates of the switching transistors. As will be discussed in greater detail below, DC-DC converters 10a, 10b each receive the relatively high DC input voltage from capacitor banks 210a, 210b and generates lower DC voltages suitable for control logic signals and other auxiliary hardware associates with the inverter module. In this embodiment, DC-DC converters 10a, 10b generate a 48V signal for driving a fan and/or pump. The 48 VDC input is also provided to second DC-DC converters 11a, 11b to further decrease the voltage to +/–15V.

In this embodiment, a current sensor 212 is provided along an output line 214 of tri-level inverter. Current sensor 212 senses the output current on line 214 and provides a signal indicative of the level of the output current to microcontroller 206. Microcontroller 206 is a 32-bit flash-based microcontroller or digital signal processor (DSP) preprogrammed to shutdown operation of the tri-level inverter module in the event that the output current is not within preselected limits. Microcontroller 206 also includes a communications interface 216 to facilitate off-module monitoring of the tri-level inverter module. Fiber optic lines, 218, 220, provide communication paths between microcontroller 206 and gate drivers 204a–204d, as well as between the microcontroller and external communication connection (see below), respectively.

In general, a tri-level inverter is controlled such that tri-level module 200 switches between three states, (+V, –V, and 0), hence, the name "tri-level", to convert a DC signal to an AC signal. Details of the operation of tri-level inverters, also referred to as Neutral Point Clamping (NPC) circuits are known in the literature.

In this embodiment, and as will be described below, tri-level inverter module 200 is provided such that the inverter circuitry (i.e., switching transistors 202a–202d, gate drivers 204a–204d and associated circuitry), as well as microcontroller 206, DC-Dc converters 12a, 12b, and voltage/current sensors for overvoltage/current protection are in an integrated assembly.

In general, tri-level inverter module 200 provides a stand-alone PCB-based design, integrated with the power of a processor-based embedded controller. The tri-level inverter module operates in either voltage or current control mode and with complete bi-directional power control. Further details of operating power switching circuitry in both voltage and current modes is found in U.S. Ser. No. 69/676,840, entitled, "Controller for Switch-Mode Circuitry", filed Sep. 29, 2000, and incorporated herein by reference. The integrated PCB-based design also includes fiber optic technology for providing quieter communication.

Referring to FIG. 2, DC-DC converter 12 (representing converters 10a, 10b) is a switching power supply having an input 18 for receiving a DC input voltage ($V_{in}$). DC-DC converter 12 generates a DC output voltage ($V_{out}$) and provides it to load 20 (shown in phantom).

Figure 3:
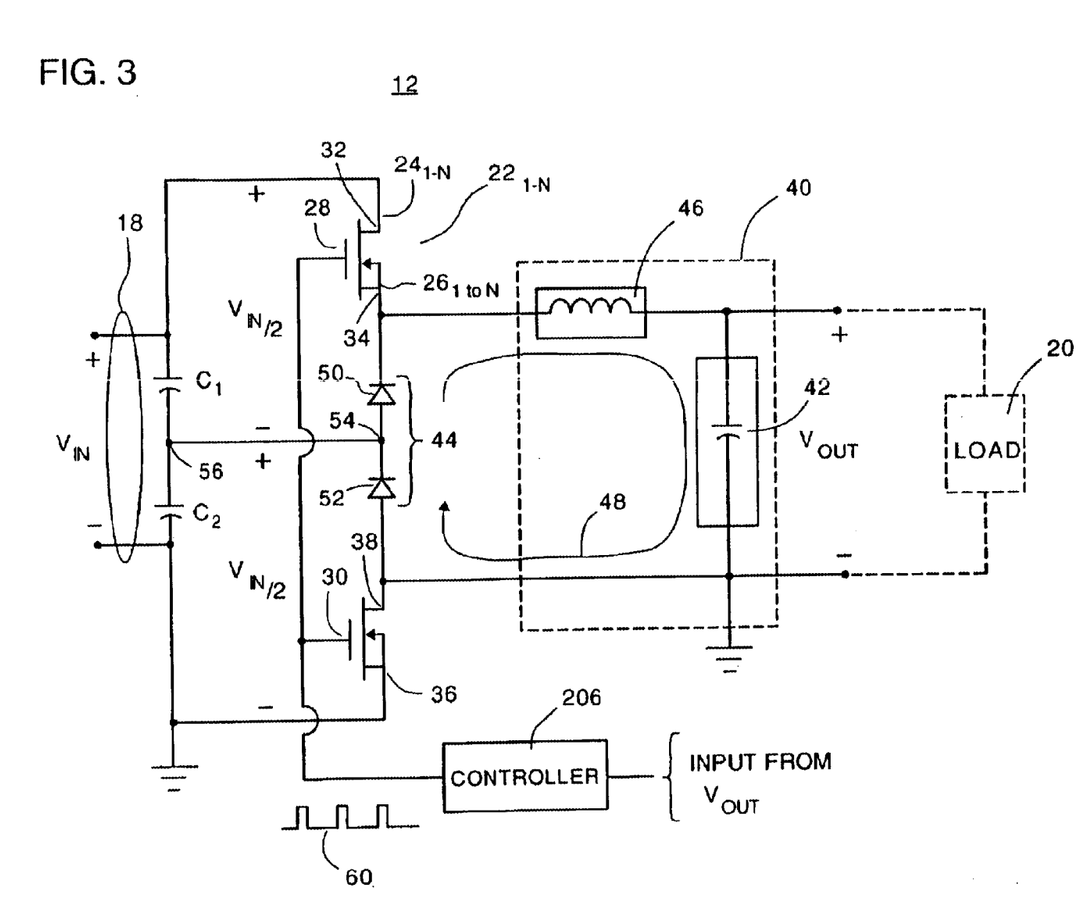
FIG. 3 is a schematic diagram of the DC-DC converter of FIG. 1B.

As shown in FIG. 3, DC-DC converter 12 includes controlled switching devices $22_{1\ to\ N}$, each having an input terminal $24_{1\ to\ N}$ and an output terminal $26_{1\ to\ N}$. While in this particular example, DC-DC converter 12 is shown to include only two (2) separate controlled switching devices (specifically referred to 28 and 30), this is for illustrative purposes only and is not intended to be a limitation of the invention, as DC-DC converter 12 can incorporate as many controlled switching devices $22_{1\ to\ N}$ as the particular application for which it is designed requires. Further, as each switching device includes input and output terminals, controlled switching device 28 specifically includes input terminal 32 and output terminal 34 and controlled switching device 30 specifically includes input terminal 36 and output terminal 38. A typical embodiment of these controlled switching devices $22_{1\ to\ N}$ is a MOSFET power transistor.

When DC input voltage ($V_{in}$) is applied to input terminal 18, storage devices $C_1$ and $C_2$ (e.g. capacitors) each charge to a potential of one half the DC input voltage ($V_{in}/2$).

Therefore, each of the controlled switching devices 28 and 30 receives only a portion of the DC input voltage ($V_{in}$). For example, if there are two (2) controlled switching devices 28 and 30 incorporated into DC-DC converter 12, DC input voltage ($V_{in}$) will be equally distributed across both controlled switching devices 28 and 30, as storage devices $C_1$ and $C_2$ will equally distribute the DC input voltage ($V_{in}$) across them. Therefore, if the DC input voltage ($V_{in}$) is 1,800 volts DC, each storage device $C_1$ and $C_2$ will only charge to approximately 900 volts DC and each controlled switching device 28 and 30 will only be exposed to that 900 volt DC differential voltage. Accordingly, since DC-DC converter 12 distributes DC input voltage ($V_{in}$) across (in this example) two controlled switching devices 28 and 30, each controlled switching device can have a voltage rating characteristic (i.e. maximum differential voltage) that is less than the DC input voltage. In this particular example, controlled switching devices 28 and 30 are only required to have a voltage-rating characteristic of 1,800 volts DC. However, as controlled switching devices 28 and 30 must switch the entire DC input voltage, the sum of the voltage rating characteristics for each of the plurality of controlled switching devices ($22_{1-n}$ generally and 28 and 30 specifically) must be greater than the maximum DC input voltage ($V_{in}$).

The DC-DC converter 12 includes a filter circuit 40 connected between output terminals 34 and 38 of first and second switching devices 28 and 30. Filter circuit 40 includes a capacitive device 42 for providing DC output voltage ($V_{out}$) to load 20. A typical embodiment of capacitive device 42 is, a capacitor having a value of 4,700 µF at 48V.

DC-DC converter 12 includes one or more diodes 44 positioned between output terminals 34 and 38 of first and second switching devices 28 and 30. Diode 44 provides a discharge path for capacitive device 42 of filter circuit 40. Typically, filter circuit 40 also includes an inductive device 46 (e.g. an inductor) positioned between capacitive device 42 and the output terminal 34 or 38 of one of the controlled switching devices 28 or 30. A typical embodiment of inductive device 46 is an inductor having a value of 5 mH.

For illustrative purposes, if controlled switching devices 28 and 30 are energized (and held closed), current will flow through these switching devices 28 and 30 and inductive device 46 (which acts as a short for DC current). Capacitive device 42 (which acts like an open circuit for DC current) will begin to charge. After a finite period of time, capacitive device 42 will be fully charged, where the voltage across this capacitive device will be approximately equal to the DC input voltage ($V_{in}$). When controlled switching devices 28 and 30 are deenergized (and held open), capacitive device 42 will discharge through diode 44 along discharge path 48. Diode 44, while providing a discharge path for capacitive device 42, also prevents a short circuit condition from occurring when controlled switching devices 28 and 30 are energized (i.e. closed).

Typically, diode 44 consist of two separate diodes 50 and 52, where the cathode of diode 50 is connected to output terminal 34 of controlled switching device 28 and the anode of diode 52 is connected to the output terminal 38 of controlled switching device 30. Additionally, the anode of diode 50 is connected to the cathode of diode 52, where this junction 54 is connected to the junction 56 of storage devices $C_1$ and $C_2$. Therefore, junction 54 is held at the same potential as junction 56, namely half of the DC input voltage. Accordingly, when controlled switching devices 28 and 30 are closed, the voltage potential between output terminals 34 and 38 is essentially equal to the DC input voltage. Further, since junction 54 is held at a potential which is equal to half the DC input voltage, each diode 50 and 52 will be reverse biased and will have a voltage potential across it of approximately one half of the DC input voltage.

DC-DC converter 12 selectively energizes and deenergizes switching devices 28 and 30 in response to control signals from microcontroller 206, where the duty cycle of switching devices 28 and 30 controls the amplitude of the DC output voltage ($V_{out}$) delivered to load 20. As stated above, when controlled switching devices 28 and 30 are energized (and held closed), capacitive device 42 will be charged to a potential essentially equivalent to the DC input voltage ($V_{in}$). Further, as stated above, once controlled switching devices 28 and 30 are deenergized (and held open), capacitive device 42 will begin to discharge through diodes 52 and 54 and inductive device 46. As this discharge occurs, the voltage potential across capacitive device 42 will decrease. Accordingly, by varying the amount of time that controlled switching devices 28 and 30 are held closed, you can control the maximum voltage that capacitive device 42 is charged to. Additionally, by varying the amount of time that controlled switching devices 28 and 30 are held open, you can control the minimum voltage that capacitive device 42 is discharged to.

This enables the user to control the voltage seen across capacitive device 42. By reducing the duty cycle 60 of controlled switching devices 28 and 30, the voltage potential (or $V_{out}$) across capacitive device 42 can be reduced. Additionally, by increasing the duty cycle 60 of controlled switching devices 28 and 30, the voltage potential (or $V_{out}$) across capacitive device 42 can be increased. Further, once the correct voltage potential (or $V_{out}$) is present across capacitive device 42, controlled switching devices 28 and 30 can be rapidly energized and deenergized to provide a steady DC output signal ($V_{out}$). Controller 58 is configured to monitor DC output voltage ($V_{out}$) and adjust the duty cycle 60 of switching devices 28 and 30 to maintain the DC output voltage ($V_{out}$) at a predetermined level. The signal provided by controller 58 to controlled switching devices 28 and 30 can be in the form of a pulse width modulated signal (fixed frequency/varying duty cycle) or a frequency modulated signal (varying frequency/fixed duty cycle).

Figure 4:
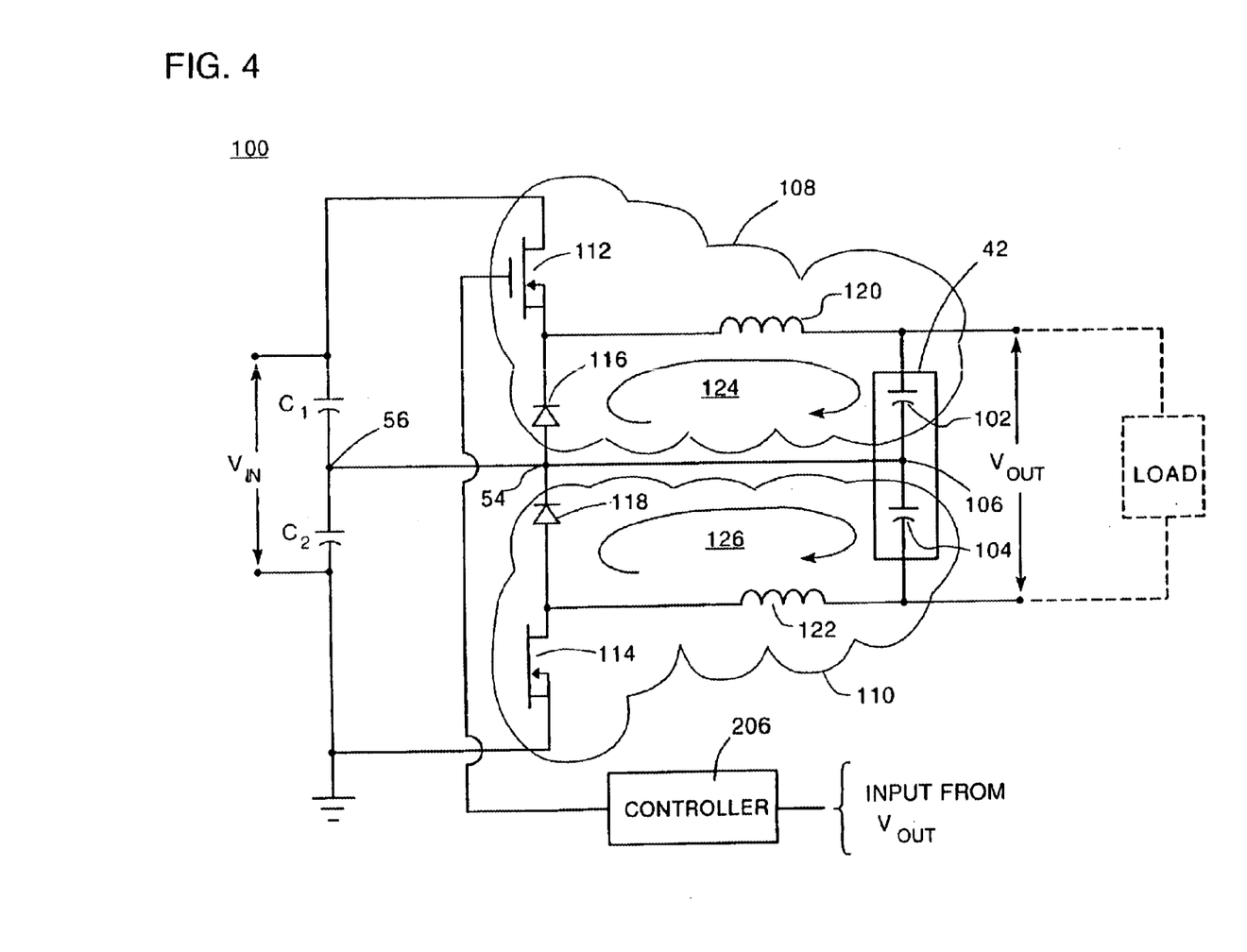
FIG. 4 is a schematic diagram of another embodiment of the DC-DC converter.

Referring to FIG. 4, there is shown an alternative embodiment of balanced power supply 100. In this particular embodiment, capacitive device 42 consists of two (2) capacitors 102 and 104, where a lead of each of these capacitors is tied together at junction 106. As stated earlier, storage capacitors $C_1$ and $C_2$ are tied together at storage junction 56, which is tied to diode junction 54. Further, capacitive junction 106 is tied to diode junction 54. This results in essentially two separate and distinct converter systems 108 and 110. Each one of these converter systems 108 and 110, incorporated into balanced power supply 100, consists of a primary switching device 112 and 114, a secondary switching device 116 and 118, an inductive device 120 and 122, and a capacitive device 102 and 104. Each of discrete converter systems 108 and 110 is commonly referred to as a "buck" converter. While FIG. 4 shows secondary switching devices 116 and 118 as diodes, this is for illustrative purposes only and is not intended to be a limitation of the invention, as these devices can be replaced with any equivalent device known in the art. For example, secondary-switching devices 116 and 118 can be MOSFET transistors with their gates tied to their sources. Alternatively, secondary-switching devices 116 and 118 can be solid-state diodes or transistors. As diode junction 54 is tied to capacitive junction 106, a balanced power supply 100 is created which has two (2) separate discharge paths 124 and 126, one for each capacitor 102 and 104 respectively. In operation, when primary switching devices 112, 114 are activated, each of capacitive devices 102 and 104 is charged to a potential of essentially $V_{in}/2$. When primary switching devices 112, 114 are deactivated, each of capacitive devices 102 and 104 discharges through discharge paths 124, 126 which include diodes 116, 118, respectively.

DC-DC converter 12 can be used in a wide variety of applications in which distributing a DC voltage across multiple switching devices is advantageous.

Referring to FIGS. 5A–5D, capacitor banks (non-electrolytic) 210a, 210b, tri-level DC-AC inverter 10, gate drivers 204a–204d, microcontroller 206, and DC-DC converters 12a, 12b, as well as associated circuitry, are constructed within an integrated hybrid assembly 300. Interconnections between these components are generally provided using printed circuit board (PCB) technology and copper bus bar, structures.

Figure 5A:
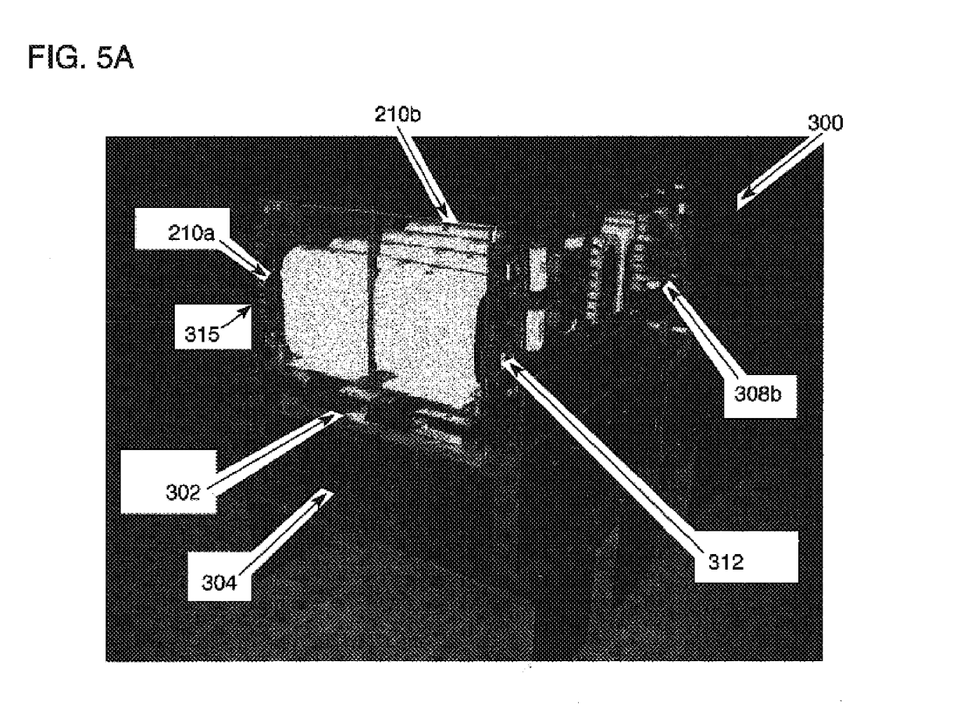
FIG. 5A is an end view of the integrated tri-level inverter module of FIG. 4.
Figure 5B:
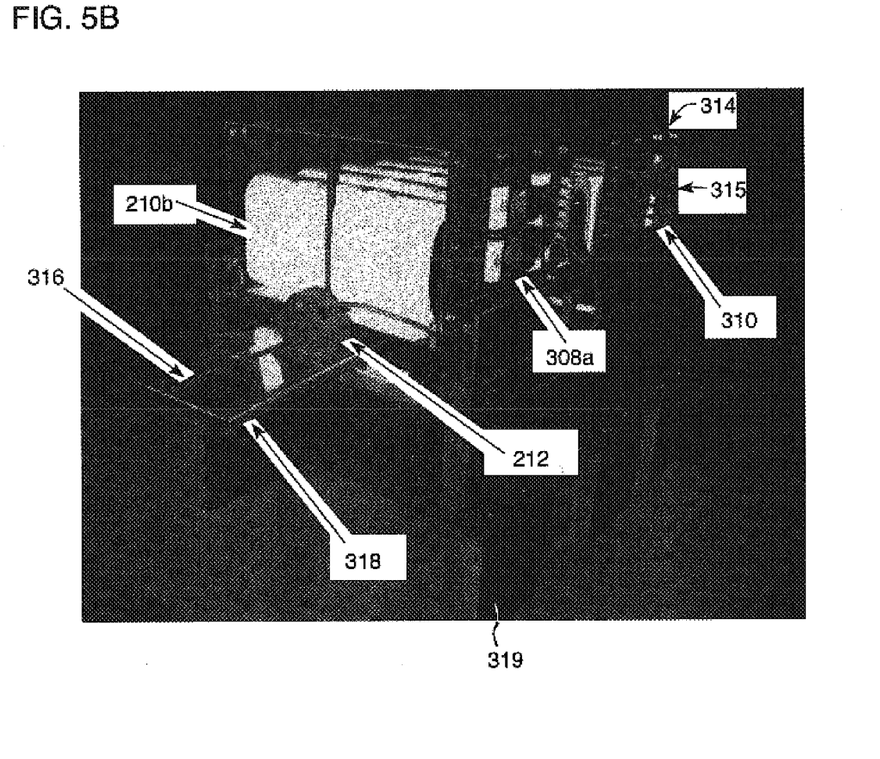
FIG. 5B is an opposite end view of the integrated tri-level inverter module of FIG. 5A
Figure 5C:
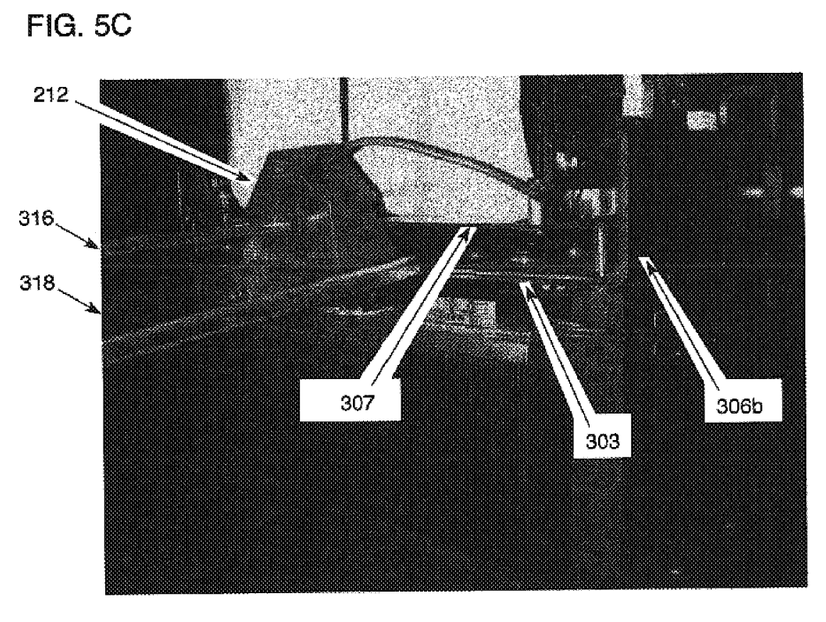
FIG. 5C is an enlarged end view of the integrated tri-level inverter module of FIG. 5B.
Figure 5D:
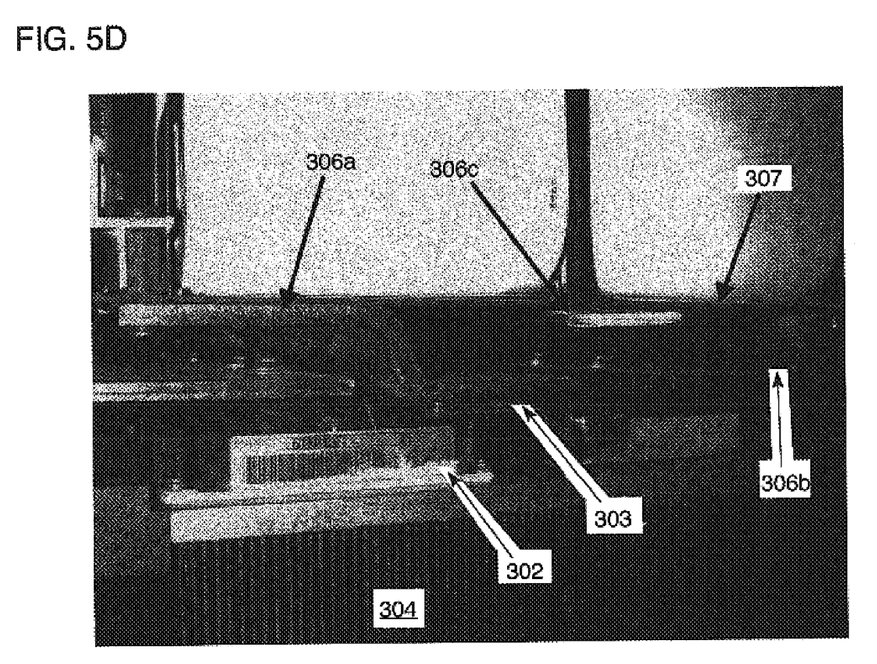
FIG. 5D is another enlarged end view of the integrated tri-level inverter module of FIG. 5B.

As shown in FIG. 5D, integrated hybrid assembly 300 includes a tri-level inverter PCB 302 upon which power semiconductor devices (e.g., IGBTs) are mounted. Tri-level inverter 302 is mounted to a finned heat sink 304 for dissipating heat generated by the hybrid assembly. Heat sink 304 represents a cooling system for hybrid assembly 300 and generally includes fans (not shown) secured to the heat sink below the finned portion. In this embodiment, hybrid assembly 300 is supported on legs 319 (Fig. 5B) to provide clearance for the fans. In alternative embodiments, liquid cooling can be incorporated within heat sink 304.

Mounted above tri-level inverter. PCB 302 are the gate driver PCBs 303 (only one shown), and the bus bars 306a, 306b, and 306c. The bus bars include the positive (+) bus bar 306a, negative (−) bus bar 306b, and neutral bus bar 306c. Connected to and positioned above the bus bars is a capacitor bank PCB 307 upon which capacitor banks 210a, 210b are mounted.

Referring again to FIGS. 5A and 5B, DC-DC converters 12a, 12b are constructed on individual power supply PCBs 308a, 308b that extend vertically from the hybrid assembly 300 on either side of capacitor banks 210a, 210b. Similarly, microcontroller 206 is constructed on an individual microcontroller PCB 310, adjacent to power supply PCB 308a and extends vertically from hybrid assembly 300. A spacer PCB 312 is symmetrically positioned on the opposite side of PCB 310 and adjacent power supply PCB 308b. In essence, power supply PCBs 308a, 308b, microcontroller PCB 310, and spacer PCB 312 form vertically extending sidewalls on either side of capacitor banks 210a, 210b. A cover plate 314 is attached to upper ends of power supply PCBs 308a, 308b, microcontroller PCB 310, and spacer PCB 312 and over capacitor banks 210a, 210b. In addition, fiber optic communication lines 315 are shown extending from microcontroller PCB 310 for connection to gate driver PCBs 303.

Referring to FIG. 5C, integrated hybrid assembly 300 includes an output bus bar 316 and neutral bus bar 318, both of which are electrically connected to tri-level inverter PCB 302. Current sensor 212 is positioned, around output bus bar 316.

In general, the use of PCB technology, bus bars and fiber optic communication eliminates much of the wiring typically associated with conventional high power assemblies and provides a "connect-and-go" integrated assembly of reduced modular size that is less expensive and easy to fabricate. With this arrangement, the only external buswork required is that between the integrated assembly and the outside world to which it supplies power. As important as the reduction in size and cost, the integrated assembly approach provides a significant improvement in the electrical performance of the hybrid assembly. In particular, the bus bars significantly reduce the inductance seen by the inverter circuitry. The lower inductance maintains voltage stresses on the inverter to manageable levels. The integrated approach also allows the use of smaller, generally more available and less expensive components and reduces cooling requirements.

In general, the hybrid integrated construction provides relatively short interconnection paths between the high-powered switching components thus minimizing inductance and other parasitic losses. Minimizing these parasitic losses eliminates the need for additional circuitry, such as capacitive snubbers, typically used to compensate for capacitance.

Furthermore, the level of filtering at the output of the assembly is reduced, thereby reducing the size and power loss associated with such circuitry. Indeed, integrated hybrid assembly 300 is capable of providing 2.5 MWatts at 7.6 KV DC within a construction having a height of approximately 20.5 inches from the top of cover plate 314 to the top of the fans, a width of approximately 20.5 inches, and a length of approximately 28 inches (not including output bus bar 316 and neutral bus bar 318 as shown in FIG. 5B).

Other embodiments are within the claims. For example, it is important to appreciate that although DC-AC inverter 10 was described as being in the form of a tri-level inverter, other n-level converters are within the scope of the invention. In particular, the concept of the invention is applicable to n-level inverters where n is greater than or equal to three. Thus, a 5-level inverter would include switching circuitry for switching between any two of five voltage levels. Furthermore, because the n-level converters are bi-directional, they can be configured to operate as AC-DC converters (rectification), DC-DC converters, DC-AC converters (inversion), and AC-AC converters.

A number of embodiments of the invention have been described. Nevertheless, it will be understood that various modifications may be made without departing from the spirit and scope of the invention. Accordingly, other embodiments are within the scope of the following claims.

What is claimed is:

1. An integrated assembly comprising:
   a power converter module including:
   at least one input bus bar;
   at least one output bus bar;
   an n-level converter connected to the at least one input bus bar and the at least one output bus bar, the n-level converter adapted to switch between a pair of voltage levels selected from a set of n levels, where n is three or greater;
   a power supply for providing power to the converter module;
   driver circuitry adapted to control the n-level converter in response to received control signals;
      a controller providing the control signals to the driver circuitry; and
      fiber optic lines connecting the controller to a communication connection external to the integrated assembly.

2. The integrated assembly of claim 1 wherein the n-level converter and driver circuitry are assembled onto a printed circuit board.

3. The integrated assembly of claim 1 further comprising a DC-DC converter which, in operation, receives a DC input voltage, generates a DC output voltage and provides the DC output voltage to the power converter module, the DC-DC converter including a plurality of controlled switching devices, each receiving a portion of said DC input voltage and each having a voltage rating characteristic less than said DC input voltage, the sum of said voltage rating characteristics of each of said plurality of controlled switching devices being greater than said DC input voltage.

4. The integrated assembly of claim 3 wherein said plurality of controlled switching devices includes: a first switching device; and a second switching device, the DC-DC converter including a filter circuit connected between output terminals of said first and second switching devices.

5. The integrated assembly of claim 4 wherein said filter circuit includes a capacitive device for providing said DC output voltage to said n-level converter.

6. The integrated assembly of claim 4 wherein said first and second switching devices are power transistors.

7. The integrated assembly of claim 6 including a diode, positioned between said outputs of said first and second switching devices, for providing a discharge path for said capacitive device of said filter circuit.

8. The integrated assembly of claim 1 wherein the controller is adapted to selectively energize and deenergize the first and second switching devices, a duty cycle of said switching devices controlling the amplitude of said DC output voltage.

9. The integrated assembly of claim 8 wherein said controller, in operation, is configured to monitor said DC output voltage and adjust said duty cycle of said controlled switching devices to maintain said DC output voltage at a predetermined level.

10. The integrated assembly of claim 1 wherein said controller includes protection circuitry which in response to an indication of an overvoltage condition at an output of the n-level power converter module, provides a signal to the controller to terminate operation of the n-level power converter module.

11. The integrated assembly of claim 10 wherein the protection circuitry includes a sensor which monitors the output of the n-level power converter module and, in response to a fault condition of the integrated assembly, provides the signal to the controller to terminate operation of the n-level power converter module.

12. The integrated assembly of claim 11 wherein the sensor monitors the output current of the n-level power converter module.

13. The integrated assembly of claim 1 further comprising a cooling system.

14. The integrated assembly of claim 1 wherein the cooling system includes a heat sink for dissipating heat generated by the integrated assembly.

15. The integrated assembly of claim 1 wherein the n-level converter has a power capacity of at least 1 megawatt.

16. The integrated assembly of claim 15 wherein the n-level converter has a power capacity of at least 1 megawatt at 7.6 KV.

17. The integrated assembly of claim 1 wherein the integrated assembly has a width of approximately 20 inches, a length of approximately 28 inches, and a height of approximately 23 inches.

18. The integrated assembly of claim 1 wherein the n-level converter is a tri-level converter.

19. The integrated assembly of claim 18 wherein the tri-level converter is a tri-level inverter.

* * * * *